UNITED STATES PATENT OFFICE.

ARTHUR EICHENGRÜN, OF BERLIN, GERMANY, ASSIGNOR, BY MESNE ASSIGNMENTS, TO AMERICAN CELLONE COMPANY (INC.), OF NEW YORK, N. Y., A CORPORATION OF NEW YORK.

PROCESS FOR THE PRODUCTION OF NONINFLAMMABLE CELLULOID.

1,420,028.   Specification of Letters Patent.   Patented June 20, 1922.

No Drawing. Application filed November 23, 1910, Serial No. 593,773. Renewed August 31, 1921. Serial No. 497,240½.

(GRANTED UNDER THE PROVISIONS OF THE ACT OF MARCH 3, 1921, 41 STAT. L., 1313.)

*To all whom it may concern:*

Be it known that I, ARTHUR EICHENGRÜN, a citizen of the German Empire, and a resident of Berlin, in the Empire of Germany, have invented certain new and useful Improvements in a Process for the Production of Noninflammable Celluloid (for which I have filed application in Germany Nov. 29, 1909); and I do hereby declare that the following is a full, clear, and exact description thereof.

It has been pointed out for some time that the non-inflammable acetyl cellulose ought to be suitable on account of its similarity to nitro-cellulose for producing celluloid-like but non-inflammable masses. However, the experiments made in this direction have not yet led to a definite result, although a series of camphor substitutes have become known, which in connection with acetyl cellulose appear suitable to give celluloid-like masses.

The reason for the failure of these experiments lies in the fact that when melting acetyl cellulose with camphor substitutes with or without the employment of pressure, and in the cold or in the hot state, such large amounts of camphor substitutes had to be taken for dissolving the acetyl cellulose, that the mass thus obtained was plastic but not hard and resilient like celluloid. With the small amounts of camphor substitutes which have to be employed for obtaining a hard celluloid, acetyl cellulose could not be treated without employing a solvent, such as chloroform, acetone, ethyl acetate, glacial acetic acid, nitro-benzene and the like. If one added large amounts of these solvents then perfect solutions or pulpy pastes were obtained, from which the solvent evaporated only slowly and so imperfectly that the mass remained soft and could not be used for a long time. If, however, only small amounts of solvents were employed, they were absorbed by parts only of the acetyl cellulose, whereas other parts remained perfectly dry, so that only non-homogeneous sticky mixtures resulted.

Now I have found that by employing such small amounts of camphor substitutes as allow of obtaining a hard final product, acetyl cellulose can be brought into a swollen or gelatinous state, from which hard, perfectly celluloid-like masses can be obtained if a uniform distribution of the camphor substitutes with the powdered acetyl-cellulose (which in weight and volume is considerably greater than that of the camphor substitutes). In order to effect this uniform distribution, the camphor substitutes are dissolved in a suitable liquid solvent in such quantity that the acetyl cellulose is uniformly wetted by this solution upon being thoroughly mechanically kneaded therewith. This kneading or mechanical working is most efficacious when carried on at a high temperature.

As solvents, volatile liquids can be used which may or may not be solvents of acetyl cellulose. In the first case, however, it is preferable to use these solvents of acetyl cellulose not pure but in mixture with other liquids which do not dissolve acetyl cellulose, in order to prevent the formation of viscous acetate solutions.

In every case, however, where volatile solvents of acetyl cellulose are used, they are intended only to enable the uniform distribution of the admixtures by continued working and a swelling up or loosening of the acetate grains, and not to completely dissolve the acetate cellulose, so that only a swelling up of the latter results.

The essential advantage of this process consists in the fact, that one can work with very small amounts of liquids, so that no real solution of the acetyl cellulose in the volatile solvent or the volatile mixture results, but only such a swelling as is necessary for effecting a combination of the camphor substitutes with the acetyl cellulose.

As camphor substitutes such bodies are regarded which have a high boiling point, and which, in a liquid or molten condition, have a solvent action on the kind of acetyl cellulose in question, more particularly amides and their derivatives, esters of acids.

*Example I.*

100 parts of acetyl cellulose soluble in glacial acetic acid are submersed in a mixture of 75 parts of alcohol and 50 parts of dichlorhydrine and are mixed together until the liquid is uniformly absorbed by the acetyl cellulose powder. The mass is then heated under constant mechanical kneading until it is converted into a gelatinous state, and is then rolled out in the form of discs and carried through heated rollers until the alcohol is evaporated.

*Example II.*

100 parts of acetyl cellulose soluble in chloroform are kneaded together in a kneading apparatus with 100 parts of alcohol, 50 parts of glacial acetic acid and 35 parts manol (acetyl-methyl-aniline) and brought to a temperature of 60° to 70° centigrade until a uniform swelling of the mass is obtained and a part of the alcohol is evaporated. The mass is then worked in a manner usual for ordinary celluloid.

*Example III.*

100 parts of acetyl cellulose soluble in acetone are wetted with a mixture of 75 parts of alcohol and 75 parts of acetone and 40 parts of manol are added. The mass is kneaded at a temperature of 40° and a swelling results. Then the temperature is increased to 65° C. and after some time perfectly gelatinous masses are obtained, which are worked in the usual manner.

*Example IV.*

100 parts of acetyl cellulose soluble in ethyl acetate are moistened with 100 parts of methyl alcohol in which 30 parts of naphthyl-acetate are dissolved. After the mass is thoroughly mixed 100 parts of tetrachlorethane are gradually added in small quantities under constant kneading.

Upon continued kneading after a short time a perfect swelling up, and then a uniform solution results, although the acetyl cellulose soluble in ethyl acetate is neither soluble in methyl alcohol nor in tetrachlorethane alone.

It will of course be understood that where a non-solvent for acetyl cellulose is referred to this means a substance which is a non-solvent or practically so for the particular acetyl cellulose employed and that in the practical carrying out of the hereindescribed process the selection of a non-solvent should be made carefully and with particular reference to the make or brand of acetyl cellulose because this material may vary considerably in regard to its solubility.

In the claims appended hereto no mention is made as to whether the process defined by each claim is to be carried out in the cold or with the application of heat, it being understood that, wherever the language of any claim permits of it, the claim is to be construed broadly to cover either method.

Also, where two or more liquids are specified in a claim, it is to be understood that those liquids may be used in any manner or in any relative order that is practicable, even where such liquids are referred to as constituting a mixture. The word "mixture" is not necessarily to be taken as implying that the various individual liquids in question are brought together prior to being added to the acetyl cellulose, as such liquids forming the so-called mixture would in some cases be introduced one after the other and moreover the order in which they are introduced need not be the order in which they are named.

What I claim as new and desire to secure by Letters Patent is:—

1. A process for the production of hard celluloid material from acetyl cellulose consisting in mixing acetyl cellulose together with a camphor substitute and a volatile solvent for the acetyl cellulose, said volatile solvent being used in quantities insufficient to effect complete solution of the acetyl cellulose and in mechanically working or kneading said mixture until a composition results which on evaporation of the volatile solvent solidifies to a hard celluloid like mass.

2. A process for the production of hard celluloid material from acetyl cellulose consisting in mixing acetyl cellulose together with a camphor substitute and a volatile solvent both for the camphor substitute and the acetyl cellulose, said volatile solvent being used in quantities insufficient to effect complete solution of the acetyl cellulose and in mechanically working or kneading said mixture until a composition results which on evaporation of the volatile solvent solidifies to a hard celluloid like mass.

3. A process for the production of hard celluloid material from acetyl cellulose consisting in mixing acetyl cellulose together with a camphor substitute and a volatile liquid having a solvent action on said acetyl cellulose at the temperature employed, said volatile liquid being used in quantities insufficient to effect complete solution of the acetyl cellulose and in mechanically working or kneading said mixture until a composition results which on evaporation of the volatile liquid solidifies to a hard celluloid like mass.

In testimony that I claim the foregoing as my invention I affix my signature in the presence of two witnesses, this 20th day of November, A. D. 1910.

ARTHUR EICHENGRÜN.

Witnesses:
 HENRY HASPER,
 WOLDEMAR HAUPT.